(12) United States Patent
Yoked et al.

(10) Patent No.: US 7,178,727 B2
(45) Date of Patent: Feb. 20, 2007

(54) REMOTE CONTROLLED SEPARABLE ELECTRONIC PRICE TAG

(75) Inventors: Yehuda Yoked, Park City, UT (US); Roy S. Ophir, Greenwich, CT (US)

(73) Assignee: Tagcorp, Inc., Park City, UT (US)

( * ) Notice: Subject to any disclaimer, the term of this patent is extended or adjusted under 35 U.S.C. 154(b) by 0 days.

(21) Appl. No.: 11/043,406

(22) Filed: Jan. 26, 2005

(65) Prior Publication Data

US 2006/0163348 A1 Jul. 27, 2006

(51) Int. Cl.
  *G06K 15/00* (2006.01)
(52) U.S. Cl. .................................................... 235/383
(58) Field of Classification Search ................. 235/383
  See application file for complete search history.

(56) References Cited

U.S. PATENT DOCUMENTS

| | | |
|---|---|---|
| 4,139,149 A | 2/1979 | Cre Peau et al. |
| 4,500,880 A | 2/1985 | Gomersall et al. |
| 4,727,368 A | 2/1988 | Larson et al. |
| 4,888,709 A | 12/1989 | Revesz et al. |
| 5,019,811 A | 5/1991 | Olsson et al. |
| 5,121,563 A | 6/1992 | Connor et al. |
| 5,340,968 A | 8/1994 | Watanabe et al. |
| 5,557,096 A | 9/1996 | Watanabe et al. |
| 5,572,653 A | 11/1996 | DeTemple et al. |
| 5,635,915 A | 6/1997 | Gray |
| 5,715,622 A | 2/1998 | Giordano, Jr. |
| 5,914,670 A | 6/1999 | Goodwin et al. |
| 6,044,359 A | 3/2000 | Goodwin, III |
| 6,130,603 A | 10/2000 | Briechle |
| 6,293,463 B1 | 9/2001 | Kato et al. |
| 6,337,836 B1 | 1/2002 | Eidelson |

*Primary Examiner*—Michael G. Lee
*Assistant Examiner*—Tae W. Kim
(74) *Attorney, Agent, or Firm*—Gottlieb, Rackman & Reisman P.C.

(57) ABSTRACT

An electronic price tag is composed of separable internal and display modules and is adapted for wireless adjustment. The ID module is mounted to the goods at, for example, a point of manufacture for the goods, and contains a transponder and CPU, a receiver/decoder module, for example a horn, mounted to the placard for receiving signals from a remote location and decoding same to be inputted to the price display field and an electrically controlled latching mechanism to temporarily hold the modules together. The display module consists of a display placard, a plurality of price display fields on the placard. The separated ID module is capable of performing security and inventory functions where display is not needed. The display module is reusable and may contain a rechargeable battery.

19 Claims, 9 Drawing Sheets

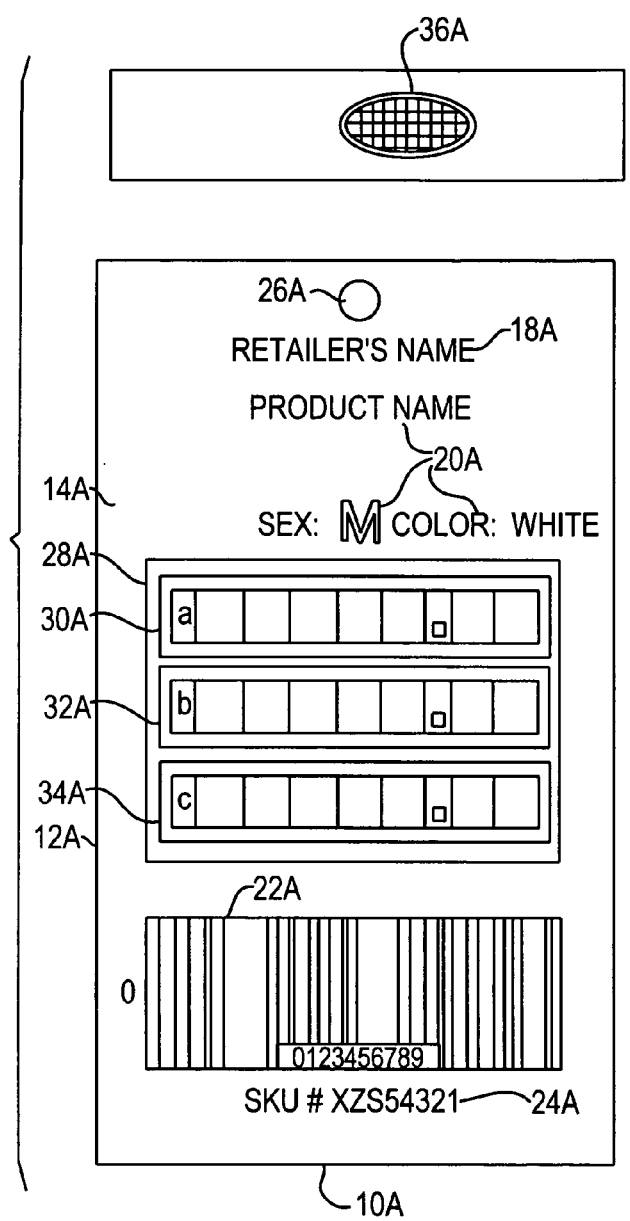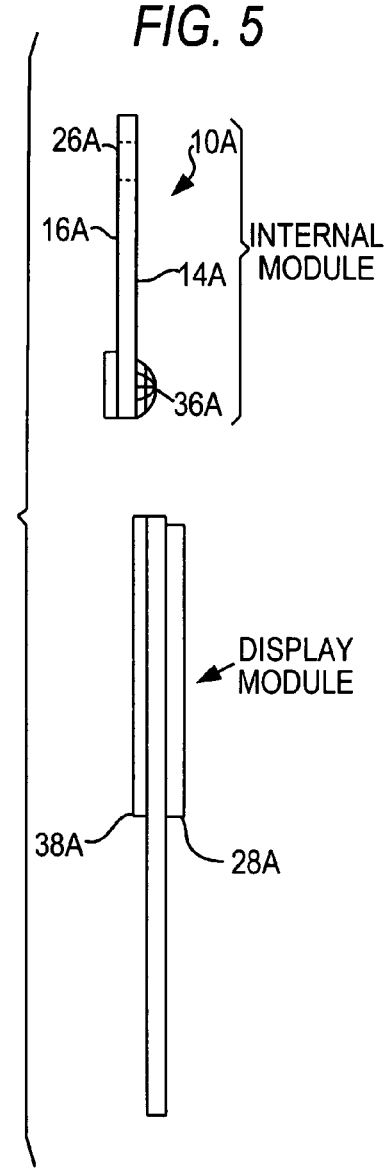
FIG. 4
FIG. 5

REMOTE CONTROLLED SEPARABLE ELECTRONIC PRICE TAG

FIELD OF THE INVENTION

The present invention relates to electronic price display systems and more particularly, to price tags that are electronically controlled from remote locations.

BACKGROUND OF THE INVENTION

The retail industry needs to be extremely efficient at identifying and ordering goods as well as at the display of the goods, posting the price of such goods and attracting the attention of its customers to the price of such goods especially when goods are marked down for promotional purposes. This applies both to inventory ordering and back ordering of goods, as well as the actual sales of goods from existing stock. Profit margins may be critically dependent on those factors, especially when retailers have to turn over or clear out stock.

A retailer orders goods or products, commonly known as SKU'S (stock keeping units), to be shipped from a manufacturer or distributor. The goods arrive at the retailer in bulk, together with invoices, bills of lading, or other transit documents that the retailer must check to confirm that the goods have indeed been delivered. The goods arrive—usually with price tags already attached. If the price tag is incorrect or missing, the retailers usually charge back to the suppliers certain fees to recoup the retailers' expenses related to required corrective action.

The label or price tag affixed to the goods bears indicia pertaining to the particular product and store, i.e. store name, bar code, SKU, model number, size, color, etc., and is displayed when the SKU is placed out for purchase. Those goods not sold are put on sale or marked down. This requires adjusting the original price and writing the adjusted price on the tag. This may occur repeatedly before the SKU is actually sold.

The retailers' marketing (pricing) strategy is vulnerable to access by competitors when the retailer has affixed the price tag to the product before it is shipped to a specific store or stores and while the goods are often in another's possession with the price exposed. The potential for unauthorized access to the retailer's pricing strategy for a substantial time might prevent the retailer from achieving maximum profitability.

In all the situations presented above, considerable time is lost "tagging" the goods for sale and manually adjusting the price. In most instances the price is revised/adjusted downward. This imposes additional cost on the retailer due to the manual labor necessary for the "tagging" process.

In response to these problems various electronic display systems were proposed, some of which address certain of the disadvantages discussed above. None of these systems, however, have achieved commercial success mostly due to overly complicated technological conceptualizations of electronic tagging systems involving radio receivers, complex logical systems and elaborate displays. As a result they failed to reduce manufacturing costs to the price per unit that would be commercially acceptable.

Some systems are designed or purport to combat the "shrinkage" problem at retail. This formidable task requires outsmarting the technologically sophisticated thief, who may be a customer or an employee of the retailer. Such systems are very expensive and so far have not been widely adopted by the industry.

U.S. Pat. No. 5,151,684 to Johnsen is concerned with the use of an electronic inventory label as a component of a security system. It also refers to its use for pricing, tracking, accounting and inventory control. The embodiment of the system, however, is directed towards achieving/performing its security functions and therefore requires components that make the system expensive. Indeed, it is only in connection with solving security problems that a system such as that described in Johnsen could justify its high cost. Although, in principle, Johnsen's application mentions pricing, tracking and accounting, it could never be cost-effectively produced to perform those functions alone. Johnsen's system makes economic sense only when the savings to be derived from elimination of theft are substantial. The complexity of Johnsen's system is inherent in his disclosure and teaches away from the development of a practical product a claim that Johnsen never achieves or even suggests.

The Johnsen system has been an economic failure. It has been defeated by its cost and complexity. It also fails to demonstrate that it could defend against a sufficiently clever thief. Thus, its inordinate expense is unlikely to attract users who believe it could accomplish its stated purpose. Once defeated, commercial introduction was apparently dropped and never improved for practical use as a price or marking tag.

U.S. Pat. No. 5,557,096 to Watanabe et al., assigned to Nippondenso Co., Ltd., provides an electronic tag for storing delivery information having a responder to transmit the delivery information in response to a query signal. The tag has a battery that is initiated only when torn, to extend battery shelf life. This complex system is described in 76 pages of drawings. However, the product conceived is a one-piece apparatus. This is clearly seen for example in column 61, line 55 where structures are described as forming "a permanent joint", which is also described as possible by use of an adhesive agent. Its one-piece design places severe economic restriction/limitation on the entire manufacturing cost U.S. Pat. No. 5,914,670 to Goodwin, assigned to NCR Corporation, describes an integral system for providing promotional messages on an electronic price label.

Further recent examples of integral electronic labels are disclosed in U.S. Pat. No. 6,337,836, entitled "Programmable electronic label", U.S. Pat. No. 6,293,463 entitled "Electronic price label battery storage apparatus and replacement method", U.S. Pat. No. 6,130,603, entitled "Low-powered RF-linked price display system", U.S. Pat. No. 6,044,359 entitled "Method of minimizing power consumption within an electronic price label", U.S. Pat. No. 5,635,915 entitled "Transmission system" and U.S. Pat. No. 5,340,968 entitled "Information storage medium with electronic and visual areas". U.S. Pat. No. 4,139,149 to CreDeau et al. discloses a computer controller connected to a series of hard-wired display units. U.S. Pat. No. 4,500,880 to Gomersall et al. discloses a series of remote displays actuated by a computer showing pricing displays mounted on individual price tags. U.S. Pat. No. 4,727,368 to Larson et al. discloses a series of remote lock boxes controlled by a central computer through radio frequencies and/or telephone lines. U.S. Pat. No. 4,888,709 to Revesz et al. discloses what appears to be a radio transmitted series of signals directed to remote displays located on shelves to control the pricing on the remote display. U.S. Pat. No. 5,019,811 discloses a series of remote display units directed from a central system. The display units could not be used for individual price tags. U.S. Pat. No. 5,121,563 to Connor et al. discloses a display device useful for mounting cards or other items. U.S. Pat.

No. 5,572,653 to DeTemDle et al. discloses a hard wired grid controlled from a central source, having a plurality of stations which then send infrared signals to display units or can be used to receive information from shopping carts and the like to indicate shoppers habits. U.S. Pat. No. 5,715,622 to Giordano, Jr. discloses a shelf-mounted display that receives radio frequency information by means of an antenna 24 and then displays the information on a display unit 22. This system is also intended for mounting on shelves.

It is therefore desirable to separate those components that may be permanently attached to a product from those possibly more expensive components that are reusable, and to do this in a manner that advances the functionality of the separate components.

It is therefore desirable to have the SKU's arrive at the retail establishment already having a less costly portion of a price tag mounted to the SKU or even concealed within the product, which when connected to a reusable component, may reduce substantially the time required for processing incoming goods and displaying them to the purchasing public. Alternatively, the retailer may elect to have the supplier provide the SKU with a price tag having a reusable or a throwaway component already in place, attached to the SKU. This, as mentioned above, significantly affects merchants' profits. A retailer's ability to handle incoming goods that already have price tags attached, coupled with the ability to immediately display the goods without any further effort and to electronically adjust the price of the goods from a remote location so that the consumer sees the successive price adjustments displayed on the goods, is highly advantageous for a retailer. The manual labor cost is significantly reduced and the time lag associated with re-pricing is completely eliminated. The system users enjoy further advantages from the ability of the electronic tag to assist in calling attention to price reduction, inventory control and security control. Certain marketing advantages will be enjoyed by users of the system due to the look, feel and potentially sounds and visuals alerts of the invention, which are designed to attract attention from consumers during the shopping experience.

BRIEF DESCRIPTION OF THE INVENTION

The electronic price tag invention comprises two physically separated modules, an ID module and a display module. The ID module is a relatively unobtrusive and less costly component fixed to an stock keeping unit and capable of at least identifying the stock keeping unit and communicating that identification in response to an interrogating signal. It may also receive and store information concerning the stock keeping unit. That information may be provided in firmware or stored in firmware upon receipt by the ID module. The information may continue to be provided even after the ID module is attached to the stock keeping unit. Preferably the ID module does not contain a power supply but instead relies upon a transponder that derives its power from a received wireless signal. Thus the ID module serves to identify the stock keeping unit and perhaps to contain information about its pricing and marketing.

The display module has display elements such as LCDs or electronic ink. It connects with the ID module either physically or via wireless apparatus and, by utilizing information obtained from the ID module in conjunction with other information available to the display module, determines what to display and activates its display elements accordingly. The display module may have an on board power supply to drive the display elements. The display module may also, independently of the ID module's communication components, receive and store information to be displayed. For this purpose it may have its own onboard communications component, which may include a transponder assembly.

To some extent the individual components of the electronic price tag may be located on one module or the other provided that the ID module contains identification components and the display module contains display components. In addition, there may be some components, for example communication or transponder components, that may be found on both modules. The determination of what to display on the display module may be the result of an algorithm running on the ID module which communicates its results to the display module. Alternatively, the determination of what to display on the display module may be the result of an algorithm running on the display module possibly using identification information from the ID module, or an algorithm running on an outside device having a processor and communicating with at least the display module.

To overcome the shortcomings of known price tag devices and systems in the retail environment, there is provided an electronic price tag comprising two separable components, termed an "ID module" and a "display module" together comprising the "unit". It is expected that the ID module be embedded or otherwise permanently attached to the product by the product manufacturer/distributor and that the display module whether reusable or a throw away type be attached to the product by the manufacturer/distributor or the retailer. The retailer may have the option to order goods with the two components already secured or with only the ID module provided so that the retailer may opt to re-use the display modules it might already have in his possession. The unit is adapted for wireless adjustment, that consists of an ID module preferably having a transponder (or hardware sufficient to contain a unique I.D. for the product that may be accessed electronically) mounted directly to the product at the point of manufacture or at any point in the chain of commerce up to the actual location of retail sales; a display module preferably a receiver/decoder module, for example a horn, for receiving signals and decoding the same to be inputted to the price display fields (or any comparable hardware accessible from a remote unit communicating with the ID module); one or more price display fields on the display module; and a power source, for example a battery pack, on the display module to provide power for the display elements (or hardware able to be energized by a remote source). The invention is not strictly limited specifically to the manner in which tag elements are divided between the two components, but rather to having a division/separation between the components (and a remote access unit) that reduces the expense of the ID module below that of the cost of an entire tag.

Additionally, the separable and adjustable display module of the present invention permits the retailer to maintain in confidence and secrecy price information pertaining to the specific goods, i.e. the goods do not have to be routed through a supplier or other third parties that would affix the price tags to the manufactured items and have knowledge of pricing strategy. The price tag of the present invention substantially reduces, if not eliminates, the undesirable aspect of providing competitors with a way to obtain information regarding the price of particular goods prior to making the goods available for purchase. Therefore, a sale price or the lowest price for the goods can be displayed at the last possible moment.

A still another object of the present invention is to provide a separable unit that has its ID module or an integral unit comprising both internal and display modules mounted to the goods for sale at the point of manufacture of the goods.

It is another object of the present invention to provide a separable unit having one or more price display fields wirelessly adjustable from a remote location.

It is another object of the present invention to provide a separable unit whose ID module is mounted to the goods at the point of manufacture and is, after attachment to a display module, capable of displaying the price, as well as retail indicia, such as the retailer's name, product name, size, color, bar code, etc.

It is another object of the present invention to provide an ID module for a separable unit, which substantially reduces the amount of time necessary to document and inventory goods received by the retailer from the manufacturer.

It is an object of the present invention to provide a separable unit that develops customer loyalty by alerting the consumer to price reductions and showing successive price changes of goods.

It is an object of the present invention to provide a separable unit that alerts customers to the tag when the price was change through audio or visual signals.

It is an object of the present invention to provide a separable unit that may be cost-effectively used (is economical to use) in practice.

It is an object of the present invention to provide a separable unit that is usable in all retail environments with all types of goods.

It is another object of the present invention to provide a separable unit that substantially reduces the amount of time necessary to adjust the price tag to indicate price changes for the goods.

It is an object of the present invention to provide a separable unit that responds to wireless signals from radio frequencies, microwaves or other wavelengths that are actuated by a transceiver that is being controlled by computer software or some other means for executing decisions in real time with or without human intervention from a remote location.

It is an object of the present invention to provide a separable unit that permits the retailer to monitor sales and adjust marketing strategy in response to said sales without having to adjust each tag manually.

It is an object of the present invention to provide a separable unit and a system therefor which can transmit necessary pricing data to all relevant merchandise.

It is an object of the present invention to provide a separable unit and system therefore which can be manipulated from the retailer's store and/or warehouse distribution center to signal the individual price tag at the remote retail locations and notify the individual retailers that such price manipulation has occurred.

It is an object of the present invention to provide a separable unit that can be programmed to set price automatically according to predetermined algorithms. Such algorithms may lock in the lowest price for the product to comply with fair market sales or adjust automatically based on fluctuations in exchange rates or inventory levels.

It is an object of the present invention to provide a separable unit that permits pricing of the product to be completed upon first receiving the product at the retail site.

It is an object of the present invention to provide a separable unit that will be accepted by those retailers demanding SKU'S to be "pre-priced" or "pre-tagged".

It is an object of the present invention to provide a separable unit that would prevent unauthorized switching of the prices for the product.

It is an object of the present invention to provide a separable unit that has a replaceable or rechargeable power means such as a battery pack or a solar cell.

It is an object of the present invention to provide a separable unit that would be able to withstand shipment with the goods over great distances.

It is an object of the present invention to provide a separable unit that can be constructed of, for example, paperboard, cardboard, or plastics.

It is an object of the present invention to provide a separable unit the display module of which is easily removed from the goods after the goods have been purchased.

It is an object of the present invention to provide a separable unit that is also adapted for its ID module being mounted to containers for goods at the point of manufacture for the goods.

It is an object of the present invention to provide in one embodiment a separable unit whose ID module is inexpensive to manufacture.

BRIEF DESCRIPTION OF THE DRAWINGS

For a more complete understanding of the present invention, reference may be had to the following detailed description of the invention taken in conjunction with the drawings herein, of which:

FIG. 4 is a front plan view of a first embodiment of separable unit according to the present invention;

FIG. 5 is a side view of the separable unit shown in FIG. 1.

DETAILED DESCRIPTION OF PREFERRED EMBODIMENTS

The present invention is an electronic price tag system separable into two components, an ID module for attachment to a product and a display module, separable from the ID module. The display module in one embodiment includes the electronic display such as an LCD display, which, of the various electronic components, makes the greatest demand on battery power. Accordingly, the display module preferably contains a battery that may be recharged. Alternatively the display may be energized from a remote power source. Although less preferable, the power source may be a component of the ID module.

The ID module is intended to be attached by the product manufacturer. It may be supplied together with the display module, or the retailer may inventory reusable display modules. The ID module may perform functions independent of the display module.

By preferably having a transponder the ID module may respond to external electronic queries and provide inventory information or any other function, particularly where it is not necessary to provide a visual display. Similarly, the ID module may be programmed by an external source communicating through its transponder means and therefore will "know" the price of goods without requiring attachment of the display unit.

The ID module may also provide a security function by being capable of responding to a query as a customer passes outside the boundaries of a pre-determined perimeter. Such a perimeter may be enforced by directing consumers and employees to pass through an invisible electronic screening system when leaving the retail premises or by utilizing positioning systems or triangulation techniques. In any event, for little more than the cost of present security tags, the ID module may be provided by the product distributor, while the cost of the display unit is captured in a reusable device.

Before describing the details of the operation of the individual devices, the preferred means for their attachment will be described. It provides not only a secure attachment, but one that enhances the security aspects of the system.

Figure 1:
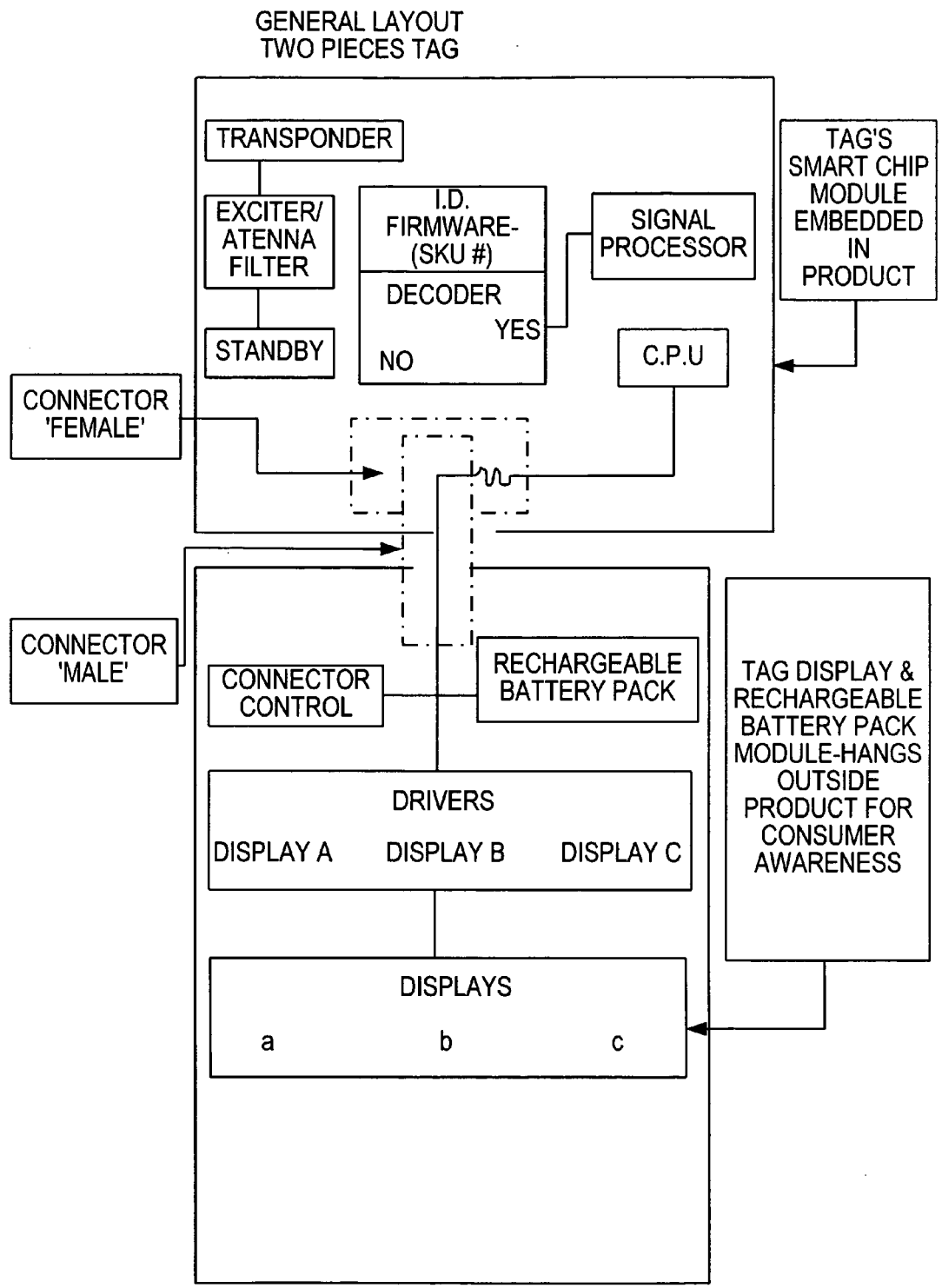
FIG. 1 is a general layout view of a preferred embodiment of the separable unit.

As shown in FIG. 1, the ID module has an attachment for mounting to a product at a point of manufacture/distribution and an electronic adjustment assembly. Examples of such attachments include plastic wires, adhesives, staples, Velcro, or sewing in place. The electronic adjustment assembly has signal receiving means, such as, an antenna for receiving a wireless signal, a filter to filter out extraneous signals, a decoder to identify a product code, a standby element connecting the filter and the decoder to determine whether to provide an actuating signal to the price tag to adjust the price of the product, a signal processor for converting signals to digital data and a central processing unit (CPU) connected to the signal processor. The ID module may also have driver elements for driving the display contained in the separable display module although these drivers are preferably part of the display module to further reduce the cost of the ID module. These various elements may be combined wholly or in part into an integrated structure such as a large scale integrated chip or printed circuit board.

Also, as shown in FIG. 1, the separable display module has a support platform with front and back surfaces, a tag display with LCD or electronic ink display, a connector control and a power source, which may be a rechargeable battery pack. Although this support platform is not necessary for the invention, it is part of the preferred embodiment because it allows for functional additions to the unit after it has been produced and integrated into the workflow of a retailer, thus enhancing the economic benefits associated with reusability. It is also within the scope of this invention to provide a rechargeable battery or other power source in the ID module. The power sources suitable for this invention could include a circuit containing a capacitor that is charged from an external source of power such as a microwave source. Another power source could be a chemical cell or solar cell.

The general layout of the separable tag system is shown in FIG. 1. The internal units comprise the transponder, exciter/antenna filter, a standby module, I.D. firmware for receiving the SKU number connected through the latch to the display module.

The display module contains a transponder, signal processor, CPU, a power source such as a battery pack that may be recharged and a connector control for controlling a latch in response to a command received from the CPU. It additionally contains the displays and the display drivers that are also controlled by the CPU. The ID module may be embedded in the product, while the display module is placed so that it may be seen by the consumer.

Figure 2:
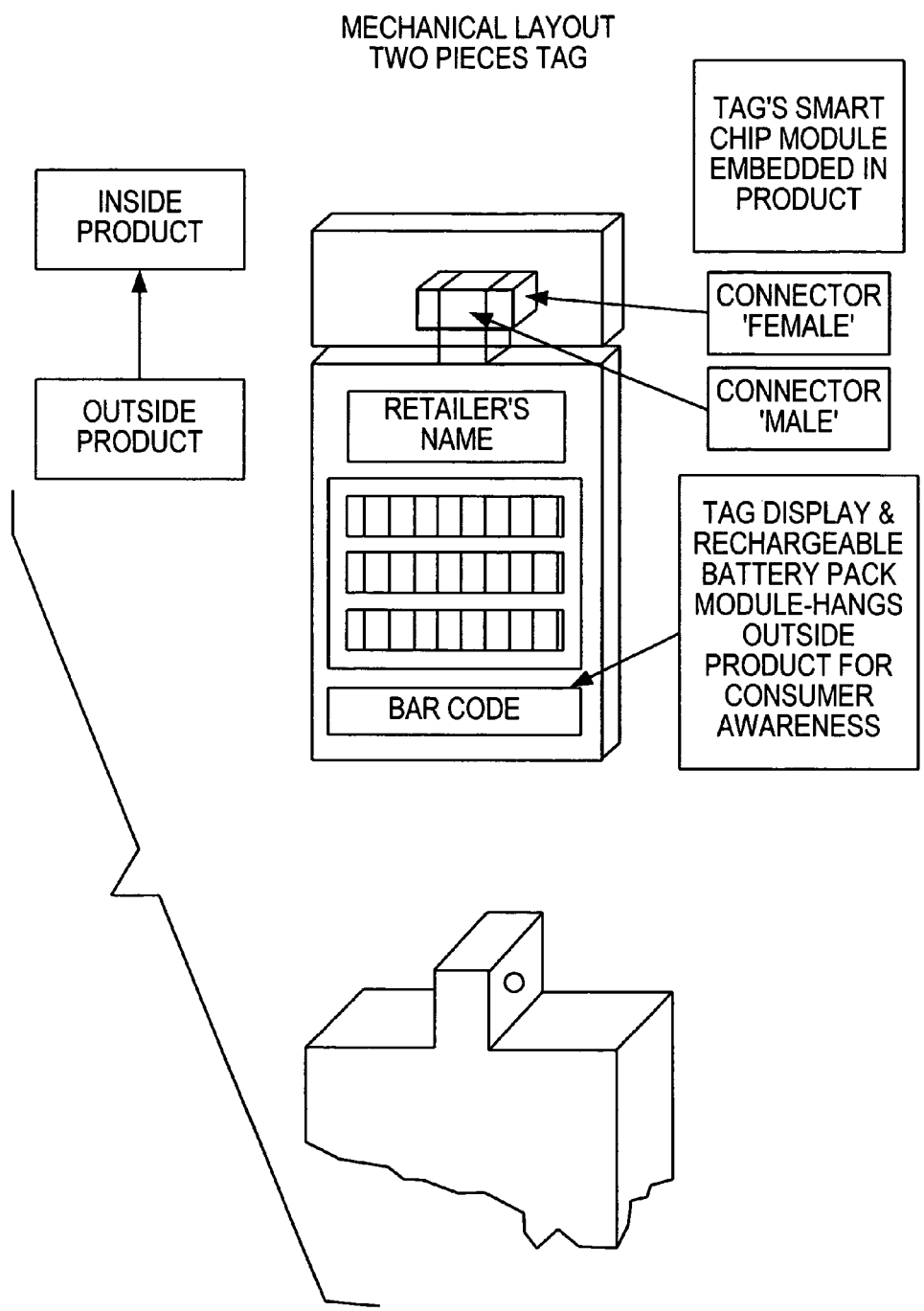
FIG. 2 is a mechanical layout view of a preferred embodiment of the separable unit
Figure 3:
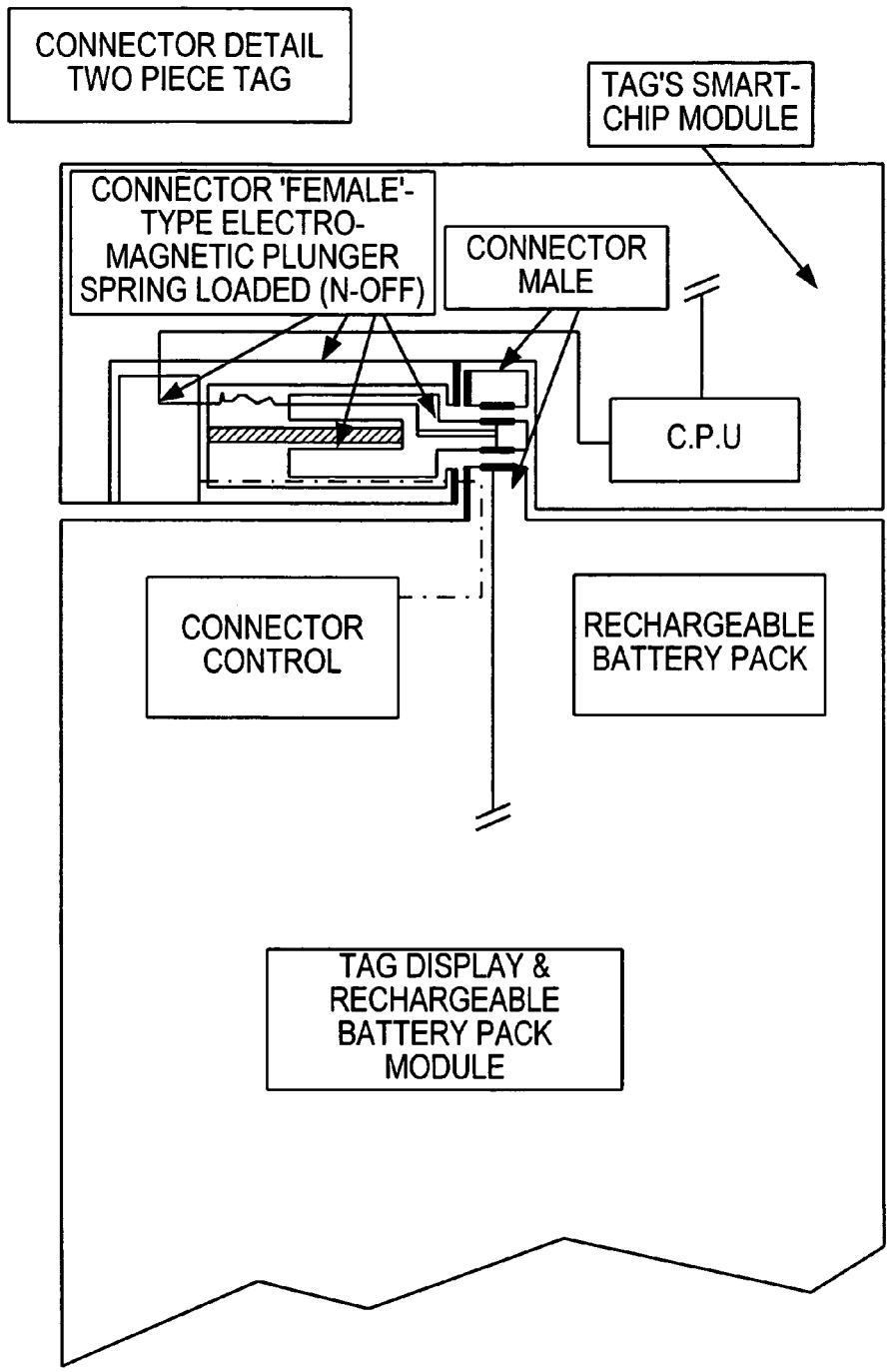
FIG. 3 is a detail of a connector of a preferred embodiment of the separable unit.

The mechanical layout shown in FIG. 2 displays a configuration for the tag unit. For connecting the separable display module to the ID module there is a latch system that is shown in FIG. 3. As shown in the figure, the latch system has a receiver in the ID module, which may be but is not required to be a female connector, and a connector in the display module, which may be but is not required to be a male connector. In the preferred embodiment, where the receiver is female and the connector male, an electromagnetic plunger is designed to enter a port in the connector to securely lock the two modules together.

The electromagnetic plunger is spring loaded to its engagement position in which it enters the port in the connector. By having a slanted surface on the plunger it is possible to engage the display module to the ID module without electrically activating the plunger. However, separation of the modules requires activation of the electromagnetic plunger as a security measure. Also, as shown in the figures, the plunger has electrical contacts, employing slip ring-brush type connectors. In particular the plunger may have a contacting ring making contact with brushes in both modules.

As an alternative to a physical latch, the two components of the tag may communicate with each other via wireless signals (for example by radio frequency or by microwave) electronic or optical signals (for example by infra red signals). The communication may take place in only one direction or involve communication intermediated by an external source and receiver.

For security purposes, at the cash register the display module is disconnected by a checking out process that provides a command to the unit to disconnect once payment is accepted. If the display module is manually disconnected (broken) accidentally or by malice a notification that could trigger an alarm system or alert security personnel, will be transmitted when the any one of the modules passes the pre-determined boundary of the retailer's secured environment.

FIGS. 4–8 disclose embodiments of a separable electronic price tag having an ID module that is affixed to goods at point of manufacture. The price tag according to the present invention is shown in FIGS. 4 and 5 generally as A; in FIGS. 6 and 7 generally as B, and in FIG. 8 generally as 1OC.

FIGS. 4 and 5, are the first embodiment of the price tag. The price tag A includes a display module having a panel or platform 12A of not-shown conductive material. The material can be made of paperboard, cardboard or polymers such as plastic, but does not have to be limited to these materials. It is preferred that the material is of a non-conductive nature so as not to interfere with the transmission and receipt of signals at the price tag A. Some flexibility of the panel A is preferred.

The panel 12A includes a front or display surface 14A, and a back surface 16A. The front surface 14A is conducive to receiving printed indicia thereon such as identifying indicia for the retailer's name 18A, product particulars such as size and color, a bar code 22A, and a stock keeping unit (SKU) number. The panel 12A can be of any size, shape or color to meet the needs of the product to be sold in the retail environment.

An electronic display region 28A is disposed on the front surface 14A of the panel 12A. The electronic display region 28A includes display fields 30A, 32A, 34A (3OA–34A). The display fields are preferably liquid crystal displays (LCDs) or electronic ink. The latter may comprise any indicia responsive to electronic signals that produce a visible image in an appropriate display. Such systems are well known in the art. The fields 30A–34A are electronically connected for separable operation or in conjunction with each other. The display fields 30A–34A may be manipulated from a remote location to display a single price or succession of prices for the goods to which the price tag 12A is attached.

An ID module comprises the other major component of the electronic price tag system. It may have an aperture 26A extending completely through its structure to facilitate attaching the ID module to the product at the point of manufacture. The aperture 26A extending through the ID module is designed to, for example, receive a plastic lanyard (not shown) to be attached to the goods at the point of manufacture. In view of its relatively few components and in those cases where it has no display elements, it may be concealed within a garment. For this reason it may be provided with a transponder to activate a security alarm or to provide inventory recognition that does not require the presence of a display function. The means of attachment may also include plastic wire, stapling, adhesives, Velcro, or sewing into the SKU. In fact, any of the attachment devices could be used within the scope of this invention.

In general then, the ID module may be utilized without the display module for inventory control and for shoplifting suppression, replacing items attached to products for those limited purposes.

A receiver-decoder horn 36A is mounted to the ID module. The horn 36A or other receiver/decoder module receives wireless signals generated from a remote location and decodes the signals to be displayed in the fields 30A–34A of the display region 28A.

A power source such as a battery pack 38A is mounted to the back surface 16A of the panel 12A of the display module to provide power for the horn 36A and the display fields 30A–34A of the display region 28A. The battery employed with the pack can be of a type that is replaceable or a disposable one. Alternatively, the power source may replenish itself, as with solar cells.

The arrangement of the display region 28A, and the battery pack 38A with respect to the panel 12A is such that these elements can be chemically fastened or press fit to the panel 12A or adjoined to each other without a panel.

Figure 7:
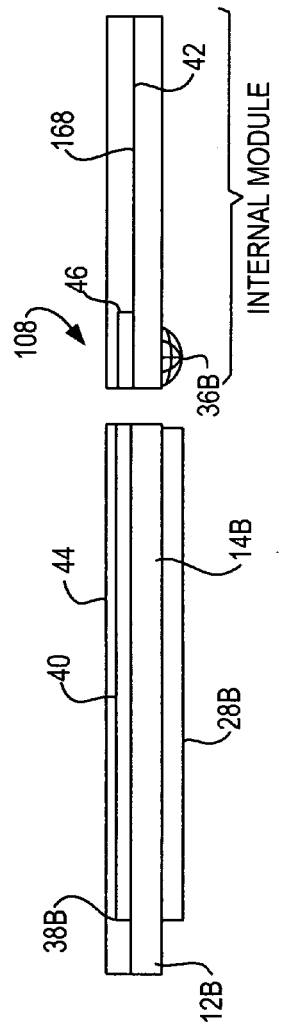
FIG. 7 is a side plan view of the separable unit shown FIG. 3.
Figure 6:
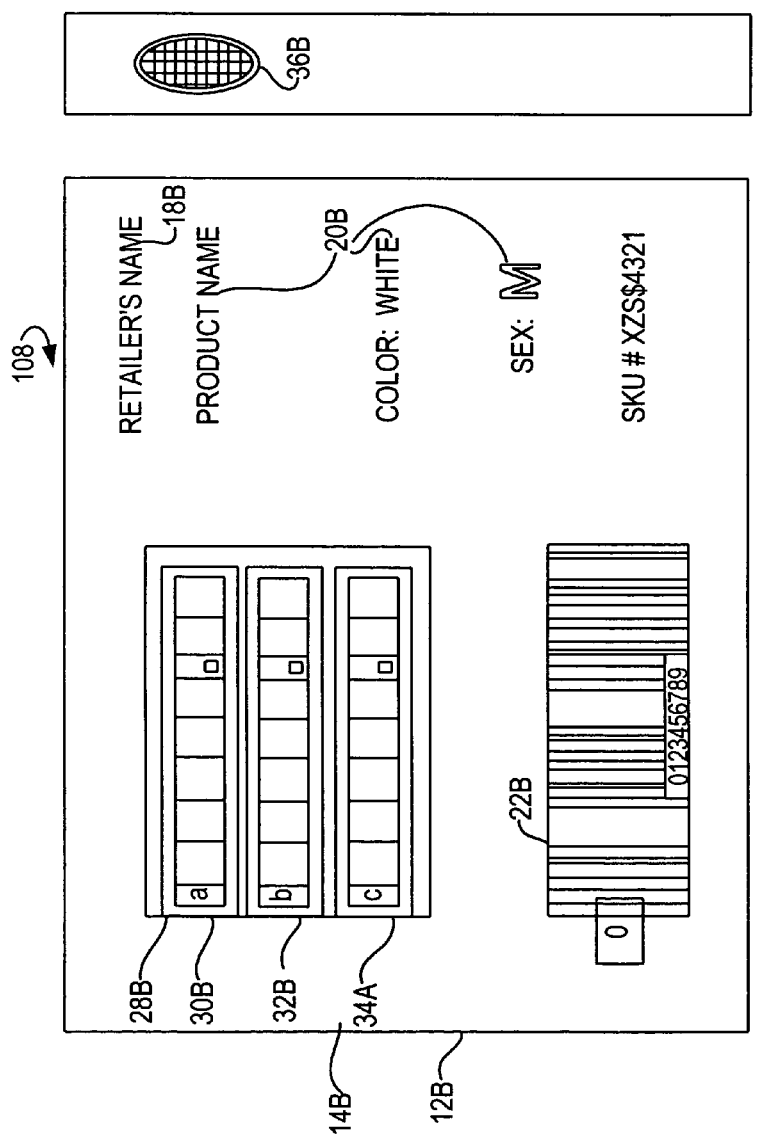
FIG. 6 is a front plan view of a second embodiment of separable unit according to the present invention.

FIGS. 6–7 disclose a second embodiment of the price tag B of the present invention. Elements for the second embodiment shown in FIGS. 6–7, which are the same as those elements referred to in FIGS. 4 and 5, are referred to by the same reference numeral including the capital letter "B". Elements in FIGS. 6–7 which correspond to the same elements in FIGS. 4–5 perform the same functions unless otherwise indicated.

This embodiment can have the ID module integrated into the products at the point of manufacture. This is preferable to fastening the module onto the containers in which the products are shipped from the point of manufacture. This allows continuous monitoring/communicating with the products from inception as they leave the assembly line through supply chain to end users as well as for the purpose of returning merchandise back to retailers and after sale service and maintenance. The less preferable attachment to the packaging is however a possibility and may require an extension 'cable' to connects the ID module with the surface of the packaging box where the display module will be attached. When checked out, the display module and the extension 'cable' are disconnected from the ID module. Alternatively, the two modules may communicate with wireless technology such as radio frequency or infrared technologies thus eliminating the need for an extension 'cable'. The battery pack 38B is mounted to the back 16B of the panel 12B in the manner described with reference to the first embodiment of FIGS. 4 and 5. However, in this embodiment, a sheet of adhesive 40 is provided to sandwich the battery pack 38B between the adhesive sheet 40 and the panel 12B. This is accomplished by having a front adhesive surface 42 of the adhesive sheet 40 pressed against the back 16B of the panel 12B to hold the battery pack 38B securely to the back surface 16B of the panel 12B.

Another preferred embodiment includes the adhesive sheet 40 having an elongated channel 46 or groove sized and shaped to receive the battery pack 38B therein. In this manner of construction, when the front surface 42 of the adhesive sheet 40 is adhered to the back 16B of the panel 12B, there is presented a uniform and streamlined appearance of the back surface 44 of the sheet 40. Another possible embodiment is to allow for a discardable or rechargeable battery that is an integral part of the printed circuit of the display module and not necessarily a separate unit. In the discardable case the whole display module may be discarded. Another possible embodiment utilizes a permanent magnet for its adhesive properties.

Figure 8:
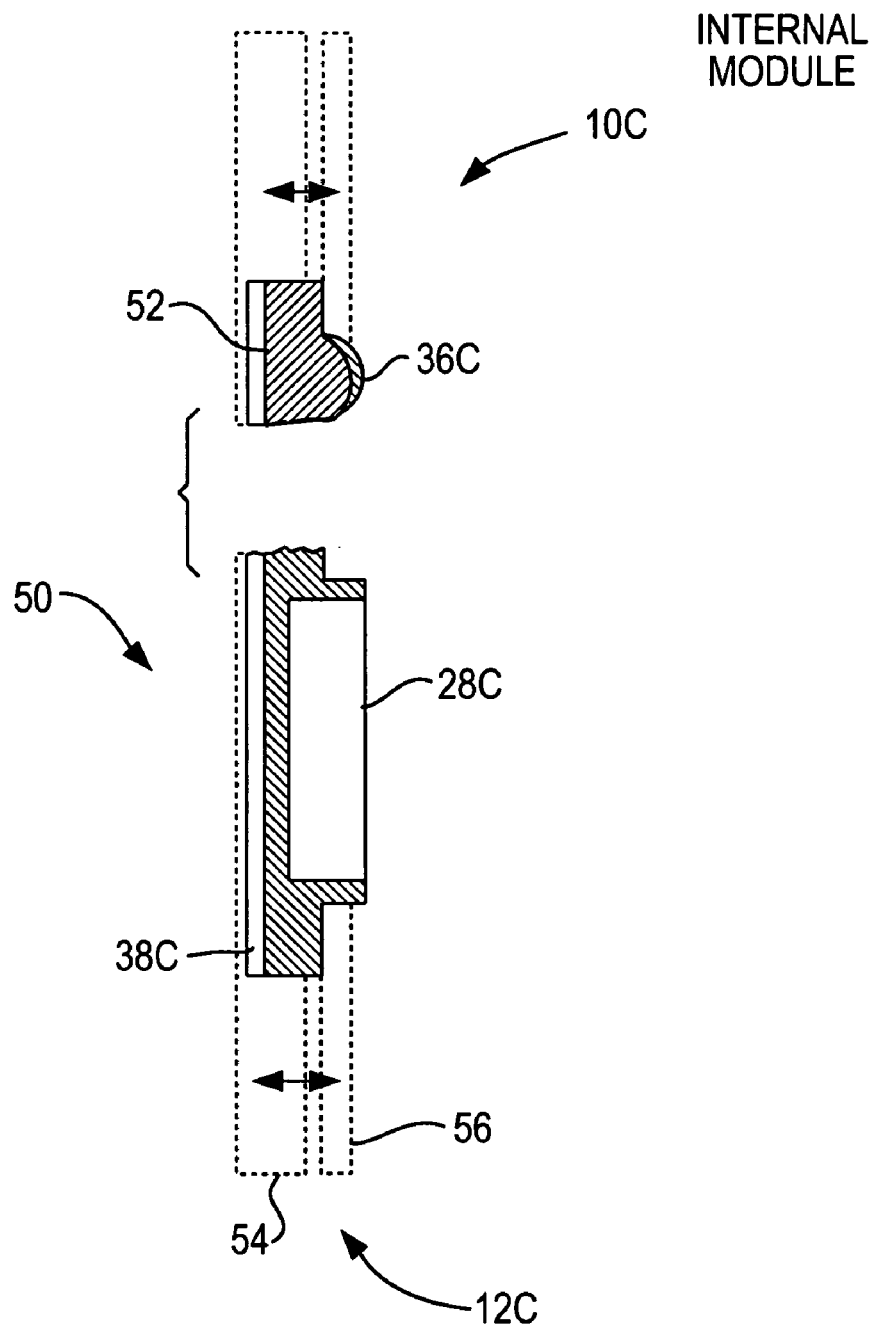
FIG. 8 is side view of a third embodiment of separable unit according to the present invention.

In FIG. 8, still another embodiment of the unit according to the present invention is shown generally at 1OC. In this manner of construction, elements that are the same as those shown with respect to the embodiment FIGS. 4–5 have the same reference number and include the letter "C". All elements perform the same functions unless otherwise indicated.

In the embodiment shown in FIG. 8, the placard or panel for the price tag is shown generally at 12C. An electronic display unit 50 on the display module consists of an LCD display region 28C, a receiver-decoder horn 36C and a battery pack 38C. Electronics for the display unit 50 are shown generally at 52. The display unit 50 is formed as an integral unit that is, for example, press fit into or sandwiched between a plurality of layers 54, 56 of the panel 12C. Other methods to mount the display unit 50 to the panel 12C can be employed.

Figure 9:
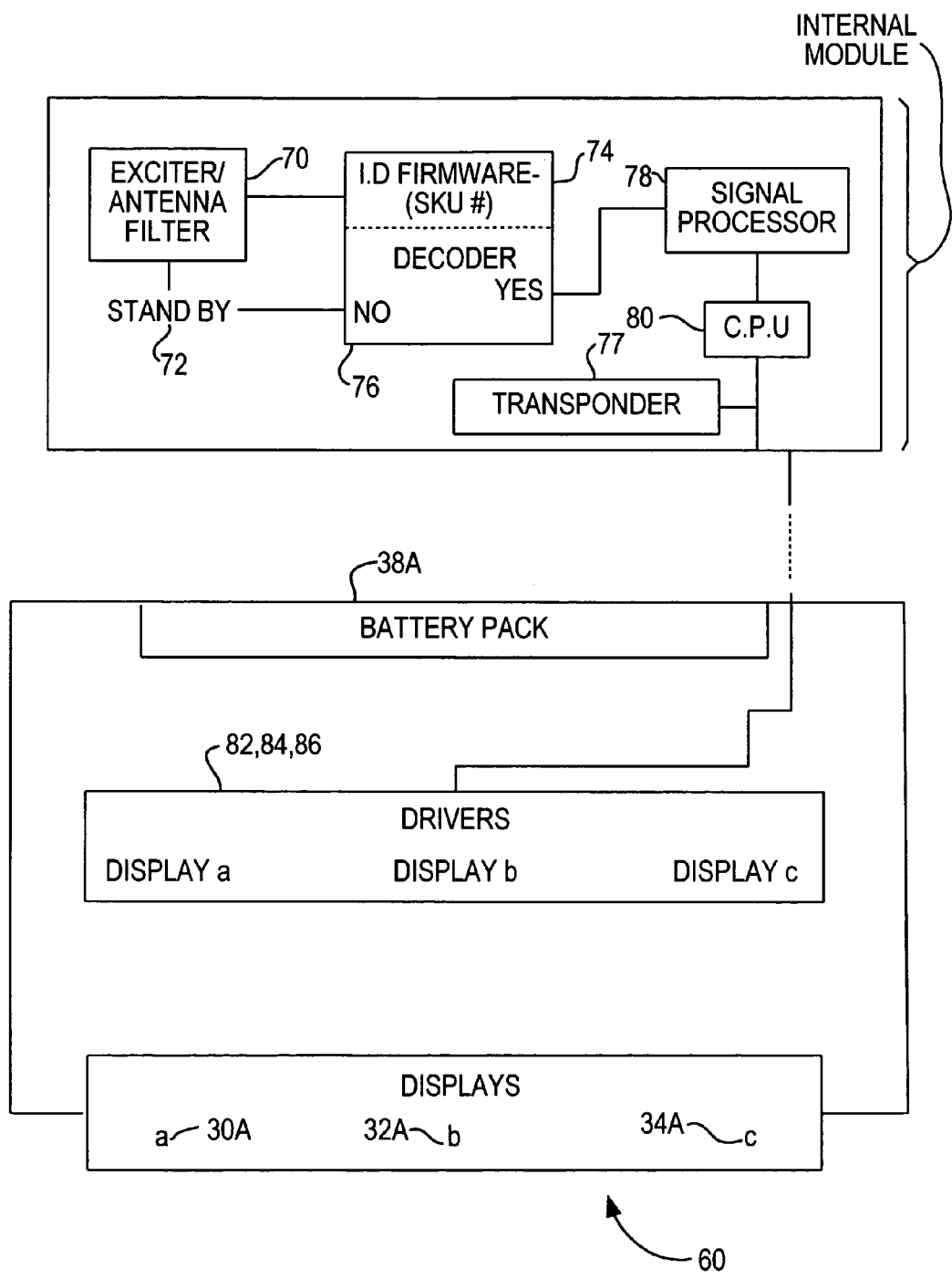
FIG. 9 is a block diagram of elements used in the separable unit of the present invention.
Figure 10:
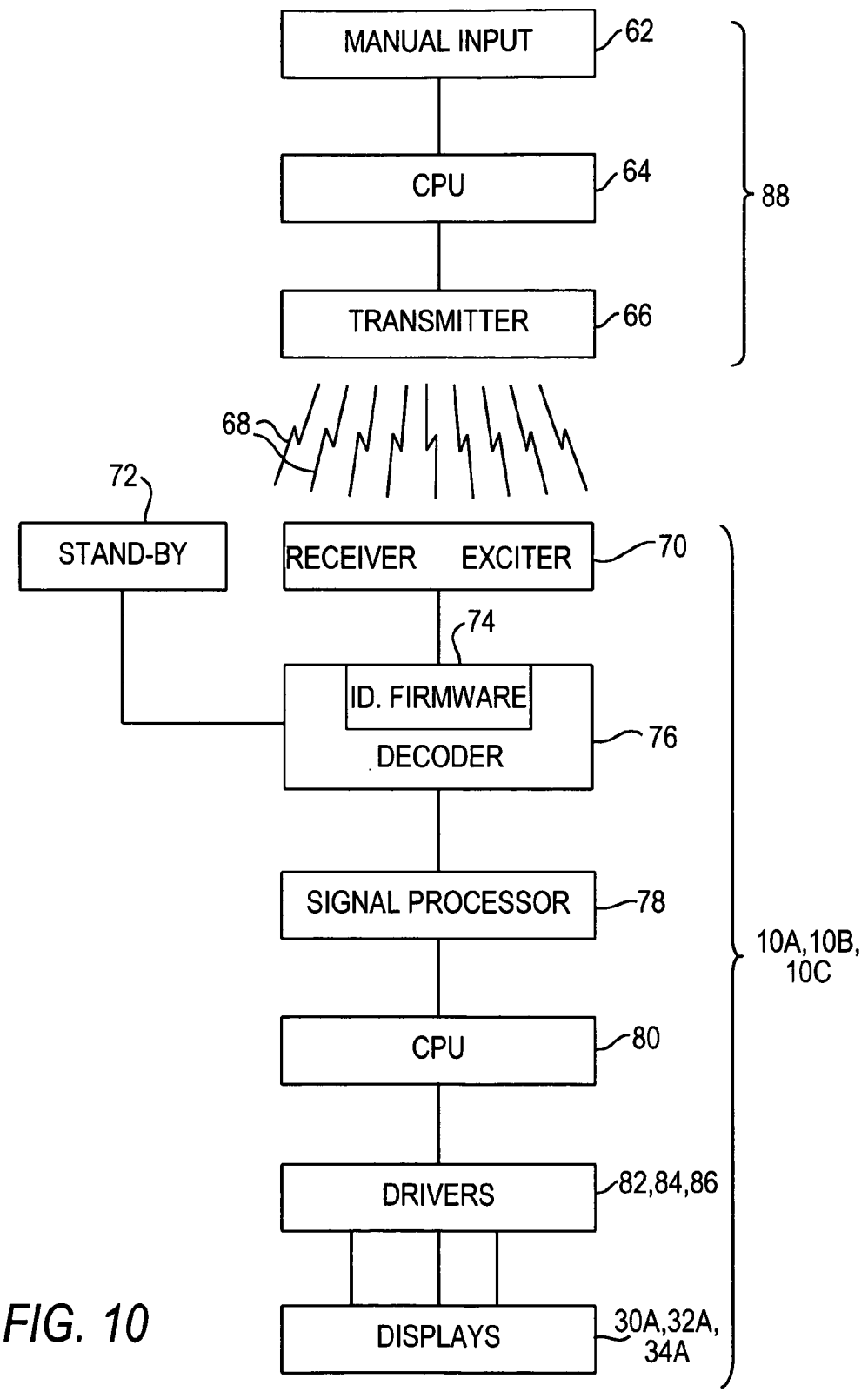
FIG. 10 is a system block diagram of the operation of the separable unit of the present invention.

Referring to FIGS. 9–10, a diagram 60 (FIG. 9) is shown for operation of the price tag 10A–1OC of the present invention. The block diagram 60 pertains to all of the embodiments shown with respect to FIGS. 4–7. All of the elements in the schematic shown in FIG. 10 form part of the electronic price tag 10A–1OC. By way of example only, reference numerals will be those used in association with the first embodiment shown in FIGS. 4–5.

At a remote location either in the retail store or at a distribution center for the retail store, manual input 62 shown in FIG. 10, is keyed into a central processing unit (CPU) 64 to store price data for later availability and manipulation. The digital data in the CPU 64 can then be processed by a signal processor into analog data for wireless transmission by a transmitter 66 to one of the embodiments of the electronic price tag A-1OC. The wireless transmission 68 can be implemented by radio waves, microwaves, etc. In the cluttered environment of a retail store and large warehouses, line of sight wireless transmissions do not provide the necessary reliability, although they can be used to a certain extent.

The wireless analog data in the signal 68 is received by the horn 36A of the electronic price tag A. An exciter 70, shown in FIGS. 9 and 10 includes an antenna and a filter that insures that only those wireless signals specific to the electronic price tag will be received. A standby 72 element is provided which interconnects the exciter 70 with an I.D. firmware 74 having the SKU product number. The standby 72 remains passive until a signal 68 is received. The firmware 74 is essentially a microchip encoded with the product data (SKU number) specific to the product to which the electronic price tag A is attached. The firmware 74 is preferably incorporated into the electronic price tag A at the point of manufacture for the product. If a decoder 76 does not recognize the required code or SKU number for the product to activate the electronic price tag for price manipulation, the standby 72 does not actuate the tag electronics. If, on the other hand, the proper code is received, the wireless analog signal 68 is converted to digital data by a signal processor 78 for use with a central processing unit 80. The CPU transmits digital data to drivers 82, 84, 86 that correspond to the display fields 30A, 32A, 34A. The drivers select the display field to which the price 25 information will be transmitted to stimulate the LCD fields so that the price selected is displayed in the fields.

As shown in FIG. 10, the electronic price tags 10A–1OC are controlled from a remote location 88. The CPU 80 is used to select a particular one of the drivers 82–86 for a corresponding one of the displays 30A–34A.

If subsequent to the date of entry of the original price, the price of the goods is reduced, the Display 'a" 30A can be maintained, and the second transmission of price data would immediately be displayed at Display 'b" (32A).

Finally, if the product after a period of time has been reduced to its final sale price, that price will be displayed in Display "c" 34A. If the price in Display 34C is the lowest price, the system can be programmed to automatically "lock-in" this price, and no further adjustments to the price will be permitted.

Figure 11:
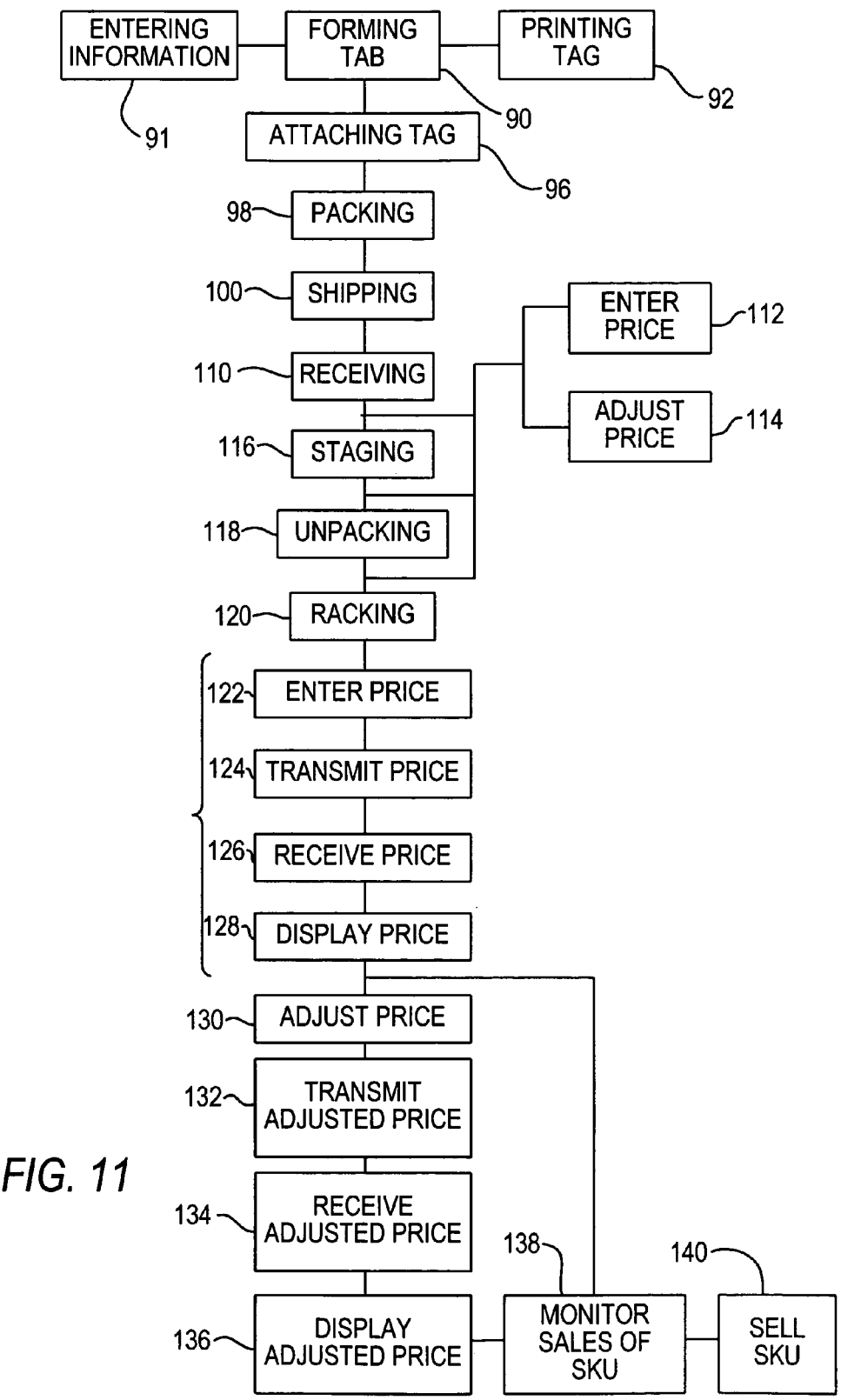
FIG. 11 is a flow chart of a method using the separable unit according to the present invention.

In FIG. 11, a flow chart of a method according to the present invention is provided. As discussed above, the cost-effectiveness of the method for the present invention derives from attaching electronic price tags to goods at their point of manufacture.

The first procedure in the method according to the present invention is forming 90 the tag to be attached to goods. The construction of the tag includes printing 92 retailer and product information on a surface of the electronic price tag. This information, including entering 94 information about the price, is done during the construction of the tag and may include the I.D. firmware 74 element as discussed above with respect to FIG. 9. The tag is then attached 96 to the specific product or SKU, after which the SKU or a plurality of the SKU'S are packaged 98 for shipment to a main distribution center for a retailer, or directly to the retailer.

At the distribution center for the retail store or the retail store, the package is received 110, where the package is staged 116 for unpack aging 118 prior to racking 120 of the SKU'S. Immediately upon receiving 110 the package having the SKU or SKU'S therein, the retailer has the option to enter the price 112 or adjust the price 114 of the SKU'S from a remote location, such as a control office of the retailer. This may be necessary due to the unusually long period of time the packaging was in transit, or perhaps supply/demand of the product has been affected, thereby warranting 114 a price change. The price entry 112 and adjustment 114 can be implemented immediately upon receiving 1 the package, i.e. the retailer does not have to remove the products from the packaging.

After it has been determined that the price does not require adjustment or the necessary price adjustment has been made, the packages are staged 116 for unpacking 118. During the staging 116 and unpacking 118 steps, and even after unpacking 118 of the products, the retailer can still manipulate the price as necessary.

Thereafter the products are racked 120, i.e. physically moved to the display racks or shelves in the retail establishment whereupon the consumers will review the products for sale.

Each of the products for sale with its own individual ID module of an electronic price tag attached to it, now ready in the display aisle, together with the display module can have its particular price adjusted. This is beneficial in that the same type of product may arrive over a period of time, for example six months, and it may be desirable to move the earlier shipped inventory under a sales program earlier than the inventory that arrived more recently. In that regard, the retailer can again, while the product is on the shelf, enter 122 the particular price for the product from the control room of the retail establishment and transmit 124 the price to that particular product for sale. The price is received 126 by the electronic price tag for a particular product' and immediately thereafter displays 128 that price selected by the retailer and transmitted from the remote location in the retail establishment.

It is understood that the central distribution site for the retail store or the chain of stores can also implement this sort of transmission to manipulate the prices of the goods.

After the particular product has been on the shelf for a period of time deemed unusually long by the retailer, the retailer merely has to go to the control room and adjust 130 the price of the particular product that needs to be adjusted downward. The adjusted price is transmitted 132 to a specific one of the electronic price tags where it is received 134 and displayed 136 on the electronic price tag attached to the product that is to be on sale.

The retailer and the central distribution site for the retailer, if one is used, can monitor 138 sales activity of the particular product at the reduced price. If it is determined that the price is still not low enough, the procedure begins all over again with the price being adjusted 130 for transmission 132 to the product. This procedure continues until the product is sold 140.

In certain industries, fair market pricing applies. In such a market, the manufacturer or controller of the product sale price under a contract with the retailer will not permit the product to be sold beneath a certain price. If this is the case, the electronic price tag A-1OC can be encoded so that the price tag locks at a certain preset price, thereby assuring the retailer that he will not sell the product below the fair market price and breach his contract and the good will that has developed with the manufacturer of the goods.

As the prices are adjusted to sell the product, each earlier price under which the product was offered may be displayed. Any number of price display fields can be manufactured into the electronic price tag as required by the retailer.

The electronic price tag can have a multiplicity of electronic price display fields 30A–34A which consumers will see to determine the successive markdowns on the products.

The pricing data used with the price tag can be stored in the computer system for subsequent recall of later received goods of similar nature.

In addition, pricing data can be stored and generated automatically at select periods of time throughout the week, month or whatever time period is designated by the retailer, so that there is an orderly procession of price reductions for goods that remain on the selling floor for an unusual period of time.

It bears emphasis that the embodiments described herein are merely exemplary and that a person skilled in the art may make many variations and modifications without departing from the spirit and scope of the invention. All such modifications and variations of the invention are intended to be covered in the appended claims.

What is claimed is:

1. A separable electronic price tag system adjustable by one or more signals from a remote location, comprising
    (A) an ID module comprising
        (a) an attachment to mount the ID module to a product;
        (b) an adjustment assembly comprising
            (1) a receiver for the signals from a remote location;
            (2) a filter to identify signals from the receiver to which the electronic price tag will respond;
            (3) a decoder having encoded data and connected to the filter to identify a product code in a signal from the filter corresponding to the encoded data and to send decoder signals;
            (4) a signal processor that receives one or more decoder signals and converts data in the decoder signals to digital data and sends processor signals;
            (5) a processing unit that receives processor signals;
    (B) a separable display module comprising
        (a) a transponder assembly comprising
            (1) an antenna for receiving a wireless signal;
            (2) a filter connected to the antenna to filter out wireless signals to which the electronic price tag is non-responsive;
            (3) a decoder connected to the filter to identify a product code in the signal corresponding to encoded data in the decoder;
            (4) a standby element interconnecting the filter and the decoder for determining whether to provide an actuating signal to the price tag sufficient-to adjust the price of the product;
            (5) a signal processor connected to the decoder for converting data in the wireless signal to digital data;
            (6) a central processing unit (CPU) connected to the signal processor;
            (7) a support platform having
                (i) a tag display comprising display elements;
            (8) one or more driver elements for activating corresponding display elements in the separable display module;
    (C) said ID module and separable display module capable of being temporarily connected by a latch system, said latch system comprising
        (a) a receiver in said ID module for a connector in said separable display module
        (b) securing means in said ID module biased to secure said connector to said receiver;
    (D) a power source mounted to one of the modules for powering the electronic price tag to display price information and to energize the latch in at least one module and, when said ID module is connected to said separable display module by said latch, to power the CPU and other electronic components of at least one of the modules.

2. The separable electronic price tag system of claim 1, wherein said ID module further comprises a transponder to respond to signals without being powered by said power source when said latch is not engaged.

3. The separable electronic price tag system of claim 1, said latch system comprises a connector control and electrical connectors completing a circuit path when said latch is engaged.

4. The separable electronic price tag system of claim 1, wherein said modules communicate with each other via wireless signals.

5. The separable electronic price tag system of claim 1, wherein said modules communicate with each other via an intermediary by wireless signals.

6. A separable two piece/module electronic price tag system adjustable by a wireless signal from a remote location, comprising
    (A) an ID module comprising
        (a) an attachment to mount the ID module to a product at a point of manufacture/distribution for the product;
        (b) a transponder assembly comprising
            (1) an antenna for receiving the wireless signal;
            (2) a filter connected to the antenna to filter out unintended wireless signals,
            (3) a decoder connected to the filter to identify a product code in the signal corresponding to encoded data in the decoder;
            (4) a standby element interconnecting the filter and the decoder for determining whether to provide an actuating signal to the price tag to adjust the price of the product;
            (5) a signal processor connected to the decoder for converting data in the wireless signal to digital data;
            (6) a processing unit connected to the signal processor;
    (B) a separable display module comprising
        (1) a transponder assembly comprising
            (i) an antenna for receiving the wireless signal;
            (ii) a filter connected to the antenna to filter out unintended wireless signals,
            (iii) a decoder connected to the filter to identify a product code in the signal corresponding to encoded data in the decoder;
            (iv) a standby element interconnecting the filter and the decoder for determining whether to provide an actuating signal to the price tag sufficient-to adjust the price of the product;
            (v) a signal processor connected to the decoder for converting data in the wireless signal to digital data;
            (vi) a central processing unit (CPU) connected to the signal processor;
        (2) a support platform having
            (i) a front surface, and
            (ii) a back surface,
        (3) a tag display comprising liquid crystal displays (LCDs),
        (4) a connector control, and
        (5) a power source,
        (6) a plurality of driver elements, for activating corresponding liquid crystal displays (LCDs) in the separable display module;

(C) said ID module and separable display module being temporarily connected by a latch system, said latch system comprising
  (a) a receiver in said ID module for a connector in said separable display module
  (b) an electromagnetic plunger in said ID module biased to secure said connector to said receiver;
(D) said power source mounted to the back surface of the support platform for powering the electronic price tag to display the price information and to energize the electromagnetic plunger in said ID module and, when said ID module is connected to said separable display module by said latch system, to power said ID module,
(E) said latch system further comprising
  (a) electrical connectors completing a circuit path only when said latch is engaged, said circuit path comprising
    (1) slip ring brush type connectors,
    (2) a power control wire, and
    (3) a ground negative wire,
(F) said ID module further comprising a transponder to respond to signals without being powered by said power source when said latch is not engaged.

7. The separable electronic price tag system of claim 6, wherein said battery is a rechargeable battery.

8. A separable electronic price tag system adjustable by a wireless signal comprising
(A) an ID module comprising
  (a) an electronic adjustment assembly comprising
    (1) an antenna for receiving the wireless signal;
    (2) a signal processor connected to the decoder for converting data in the wireless signal to digital data;
    (3) a processing unit connected to the signal processor;
(B) a separable display module comprising
  (a) a transponder assembly comprising
    (1) an antenna for receiving the wireless signal;
    (2) a filter connected to the antenna to filter out unintended wireless signals,
    (3) a decoder connected to the filter to identify a product code in the signal corresponding to encoded data in the decoder;
    (4) a standby element interconnecting the filter and the decoder for determining whether to provide an actuating signal to the price tag sufficient-to adjust the price of the product;
    (5) a signal processor connected to the decoder for converting data in the wireless signal to digital data;
    (6) a central processing unit (CPU) connected to the signal processor;
  (b) a tag display,
  (c) a connector control, and
  (d) a power source
(C) said ID module and separable display module being temporarily connected by a latch system, said latch system comprising
  (a) a receiver in said ID module for a connector in said separable display module
  (b) electrical connectors completing a circuit path only when said latch is engaged
(D) said ID module further comprising a transponder to respond to signals without being powered by said power source when said latch is not engaged.

9. The separable electronic price tag system of claim 8, wherein said ID module further comprises an attachment to mount the ID module to a product at a point of manufacture/distribution.

10. The separable electronic price tag system of claim 9, wherein said electronic adjustment assembly further comprises a filter connected to an antenna to filter out wireless signals to which the electronic price tag is non-responsive.

11. The separable electronic price tag system of claim 10, wherein said electronic adjustment assembly further comprises a decoder connected to the filter to identify a product code in the signal corresponding to encoded data in the decoder.

12. The separable electronic price tag system of claim 11, wherein said electronic adjustment assembly further comprises a standby element interconnecting the filter and the decoder for determining whether to provide an actuating signal to the price tag sufficient-to adjust the price of the product.

13. The separable electronic price tag system of claim 8, wherein said separable display module further comprises a support platform having a front surface, and a back surface.

14. The separable electronic price tag system of claim 8, wherein said tag display comprises liquid crystal displays.

15. The separable electronic price tag system of claim 8, wherein said tag display comprises a plurality of driver elements.

16. The separable electronic price tag system of claim 8, wherein said latch system further comprises an electromagnetic plunger biased to secure said connector to said receiver.

17. The separable electronic price tag system of claim 13, wherein said power source is mounted to the back surface of the support platform for powering the electronic price tag to display the price information.

18. The separable electronic price tag system of claim 17, wherein said power source powers said CPU and other electronic components of said ID module when the display module is connected to the ID module.

19. The separable electronic price tag system of claim 8, wherein said circuit path comprises slip ring brush type connectors, a power control wire, and a ground negative wire.

* * * * *